April 13, 1965 L. J. BISHOP 3,177,814
CONVEYOR SIGNAL SETTING MECHANISM
Filed Aug. 27, 1962 4 Sheets-Sheet 1

INVENTOR.
LEONARD J. BISHOP
BY
ATTORNEYS

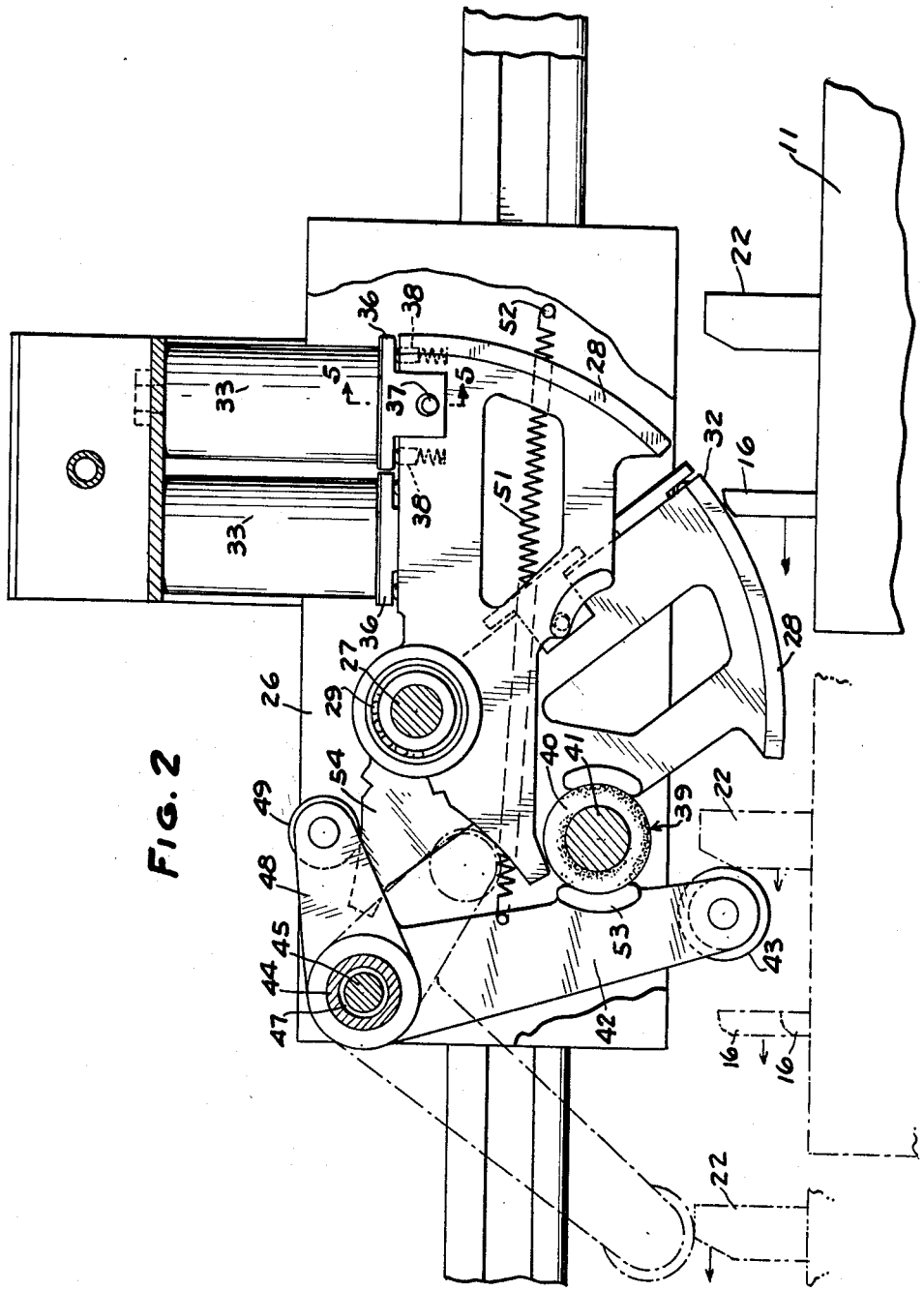

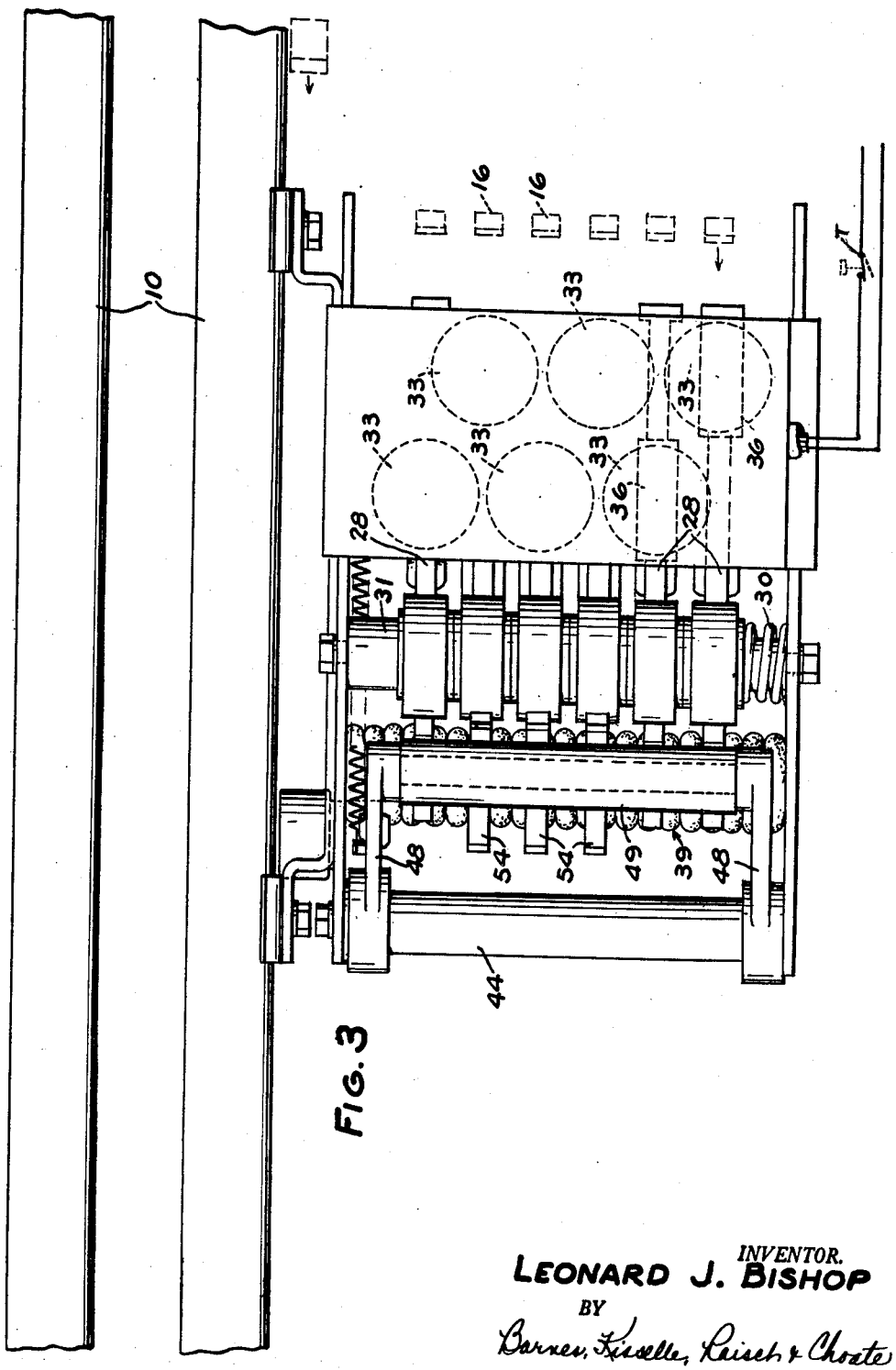

April 13, 1965  L. J. BISHOP  3,177,814
CONVEYOR SIGNAL SETTING MECHANISM
Filed Aug. 27, 1962  4 Sheets-Sheet 4
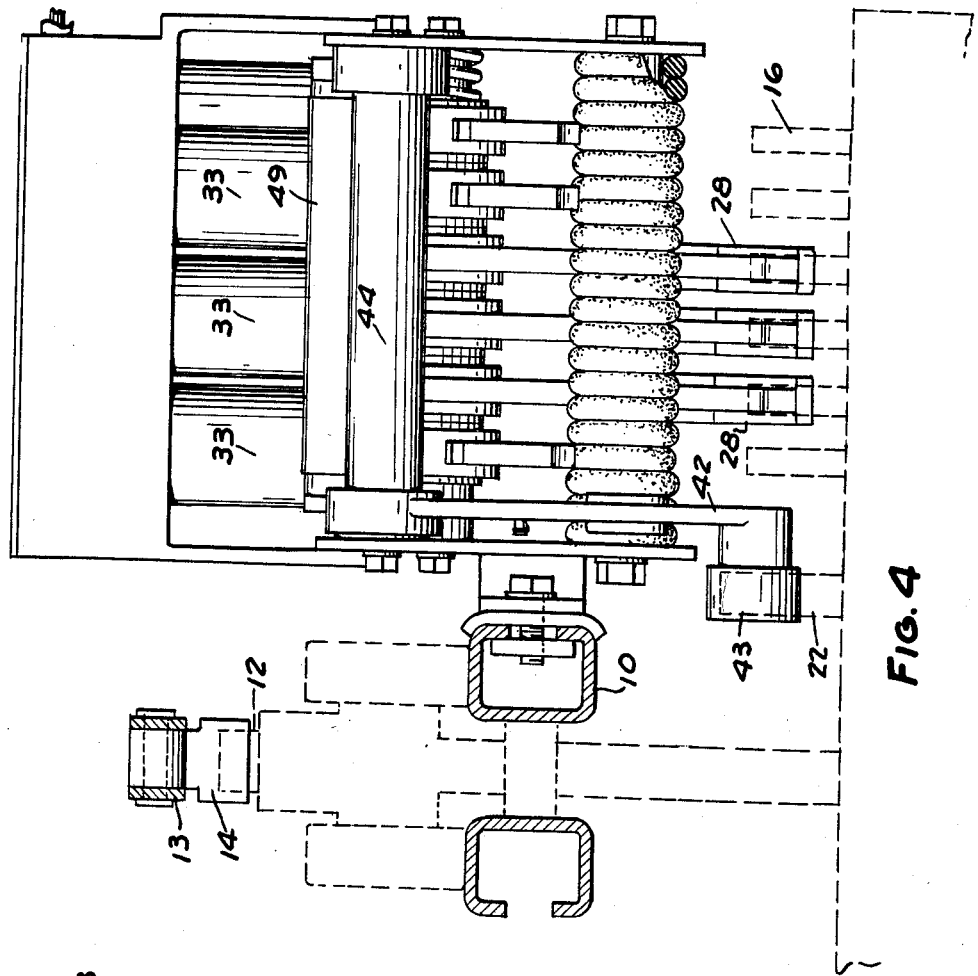
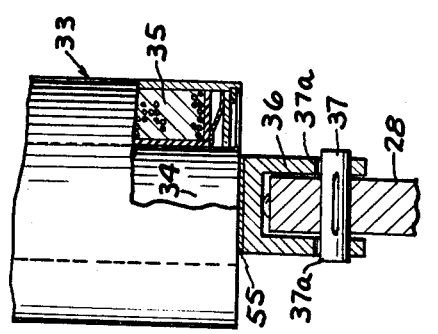
INVENTOR.
LEONARD J. BISHOP
BY
Barnes, Kisselle, Raisch & Choate
ATTORNEYS

United States Patent Office 3,177,814
Patented Apr. 13, 1965

3,177,814
CONVEYOR SIGNAL SETTING MECHANISM
Leonard J. Bishop, Birmingham, Mich., assignor to Mechanical Handling Systems Inc., Detroit, Mich., a corporation of Michigan
Filed Aug. 27, 1962, Ser. No. 219,650
14 Claims. (Cl. 104—88)

This invention relates to overhead conveyors and particularly to overhead power and free conveyors.

In a typical known conveyor system, carriers are moved along an overhead track and are periodically switched to branch tracks as may be desired. In one type of control system that is used for controlling the switching action, a plurality of sensing members or pins are vertically movably mounted on the carrier unit and are selectively positioned so that when the carrier unit moves past a reader station, a signal is produced if the pins are in predetermined relation to a signal reading device at the signal station. In connection with such systems, it is desirable to provide some means for resetting the signal pins as the carrier units move along the conveyor. In such systems, the pins are usually elevated by a fixed cam and then selectively moved downwardly by some appropriate mechanism.

It is an object of this invention to provide an improved signal pin setting mechanism.

It is a further object of the invention to provide such a signal pin setting mechanism which utilizes a minimum number of parts.

It is a further object of the invention to provide such a signal setting mechanism which is low in cost.

Basically, the signal setting mechanism comprises a plurality of cam members which are retained in elevated position out of the path of the signal pins by individual electromagnets. The electromagnets are selectively de-energized permitting the selected cams to move downwardly into the path of the signal pins on the moving carrier unit thereby camming the signal pins downwardly to the selected position. The cam members are repositioned adjacent the electromagnets by a mechanism actuated by an actuator on the moving carrier unit.

In the drawings:

FIG. 2 is a fragmentary side elevational view of the signal pin setting mechanism embodying the invention.

FIG. 3 is a plan view of the mechanism shown in FIG. 2.

FIG. 4 is a fragmentary side elevational sectional view of the pin setting mechanism.

FIG. 5 is a fragmentary sectional view taken along the line 5—5 in FIG. 2.

Figure 1:
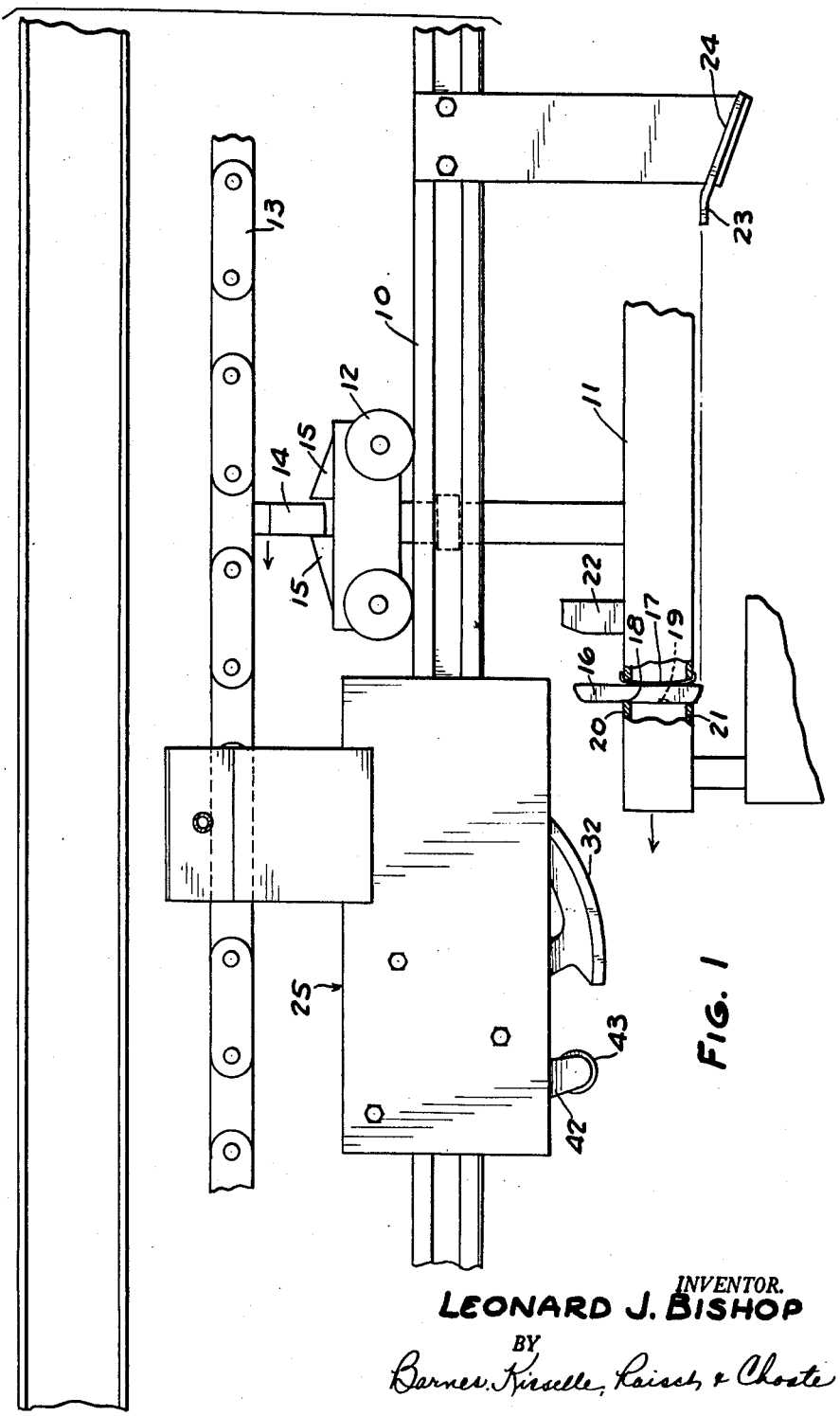
FIG. 1 is a fragmentary partly diagrammatic side elevational view of an overhead power and free conveyor system embodying the invention.

Referring to FIG. 1, the invention relates to overhead power and free conveyor systems which comprises a track 10 formed by spaced channels for supporting trolley or carrier units 11 for movement therealong. Each trolley or carrier unit 11 includes rollers 12 which ride on the channels to guide the carrier units. The carrier units are moved along the track 10 by a chain 13 having pushers 14 at longitudinally spaced points therealong for engaging dogs 15 on the carrier units 11.

Each carrier unit 11 includes a plurality of signal members or pins 16 held frictionally in adjusted position on the carrier by springs 17. Each signal pin 16 has oppositely facing notches 18, 19 which engage flanges 20, 21 on the carrier unit to limit the upward and downward movement of the signal pins 16. For purposes of convenience, the spring 17 and notches 18, 19 have been shown 90° out of position in FIG. 1. In addition, the carrier unit 11 includes a fixed dog or actuator 22 for purposes presently described. Actuator 22 is spaced laterally of signal pins 16.

As each carrier unit 11 moves along the track 10, to the left as shown in FIG. 1, the signal pins 16 are engaged by a fixed cam 23 having an underlying cam surface 24 to push the pins upwardly. This cancels the previous setting of the signal pins. As the carrier unit 11 moves further along the track 10, it passes beneath the pin resetting mechanism 25 and selected signal pins 16 are depressed or lowered as presently described.

Referring to FIG. 2, the pin resetting mechanism 25 comprises a frame 26 which is mounted adjacent the track 10. A shaft 27 is mounted on the frame 26 and extends horizontally and transversely of the conveyor. A plurality of cam members 28 which are generally sector shaped are pivotally mounted on the shaft 27 by roller bearings 29. Lateral space between the cam members 28 is taken up by a spring 30 and sleeve 31 on the shaft 27 (FIG. 3).

As shown in FIG. 2, each cam member 28 has an arcuate surface 32 which has a radius of curvature having its center at the center of shaft 27. Each cam member 28 is adapted to be retained in position out of the path of the pins 16 by corresponding electromagnet 33. As shown in FIG. 5, each electromagnet 33 comprises a core 34 and winding 35. A U-shaped shoe 36 is loosely mounted on the radial edge of the cam member 28 by a pin 37 extending through enlarged openings 37a. When the electromagnet 33 is energized, the shoe 36 is drawn and held tightly against the core 34, the loose pivotal mounting of the shoe 36 compensating for any misalignment between the electromagnet 33 and the cam member 28. As shown in FIG. 2, spring loaded plungers 38 yieldingly urge the ends of the shoe 36 outwardly relative to the cam member. In order to conserve lateral space the electromagnets 33 are staggered horizontally as shown in FIG. 3. Each electromagnet 33 may be controlled by a switch T.

When it is desired to set the pins of an oncoming carrier unit 11, the electromagnets 33 are selectively de-energized either manually or by some automatic mechanism, not shown, permitting selected cam members 28 to swing downwardly into the path of the signal pins 16 and against a stop 39 formed by O-rings 40 on a horizontal shaft 41 mounted on the frame 26.

In order to return the cam members 28 which have been permitted to fall downwardly into the path of the signal pins 16, an actuator arm 42 having a roller 43 on the lower end thereof is mounted in position to be engaged by the dog or actuator 22 on the carrier unit. The upper end of the actuator arm 42 is fixed to a sleeve 44 rotatably mounted by bearings 47 on a shaft 45 fixed to the frame 26. The sleeve 44 fixedly supports lever arms 48 between which a reset roller 49 extends and is rotatably mounted by bearings 50. A tension spring 51 normally extends between the actuator arm 42 and a fixed pin 52 on the frame 26. The spring yieldingly urges a part 53 on the actuator arm 42 against the stop 39.

After the cam members 28 have been released and the selected signal pins 16 have been depressed by the surfaces 32, the engagement of the actuator 22 on the carrier unit 11 with the actuator arm 42 swings the reset roller 49 clockwise as shown in FIG. 2 against radial projections 54 on the cam members 28. This, in turn, swings the cam members 28 counterclockwise bringing them adjacent the electromagnets 33 which hold the cam members 28 in elevated position.

In order to insure the quick release of the cam members 28 when the electromagnets 33 are de-energized, a layer 55 of non-magnetic material is preferably provided on the surface of the shoe 36.

The provision of the circular surface 32 on the cam members 28 tends to cause any force on the pin 16 on the cam members to be radial and thereby minimizes any tendency to move the cam members counterclockwise as viewed in FIGS. 1 and 2.

The elimination of moving parts between the cam members 28 and electromagnets 33 results in a dependable mechanism which can be manufactured at low cost and will have long life.

The signal setting mechanism described herein may be used with a conveyor control system such as shown in my copending application titled Conveyor Control System, Serial No. 219,626, filed August 27, 1962, executed and filed concurrently herewith.

I claim:

1. In an overhead conveyor system, the combination comprising
    a track,
    a carrier unit movable along said track,
    said carrier unit having a plurality of signal members selectively positionable vertically on said carrier unit,
    and a mechanism for resetting the signal members positioned along said track comprising
    a plurality of cam members,
    means for mounting each said cam member for movement into and out of the path of the signal members on the carrier unit,
    individual electromagnets for said cam members for upholding said cam members out of the path of said signal members,
    and means operable by the movement of said carrier unit along said track for returning said cam members into the position out of the path of said signal members after they have been released by de-energizing said electromagnets.

2. In an overhead conveyor system, the combination comprising
    a track,
    a carrier unit movable along said track,
    said carrier unit having a plurality of signal members selectively positionable vertically on said carrier unit,
    and a mechanism for resetting the signal members positioned along said track comprising
    a plurality of cam members,
    means for mounting each said cam member for movement into and out of the path of the signal members on the carrier unit,
    and individual electromagnets for said cam members for holding said cam members out of the path of said signal members and means for deenergizing each said electromagnet to permit its respective cam member to move into the path of the signal members.

3. In an overhead conveyor system, the combination comprising
    a track,
    a carrier unit movable along said track,
    said carrier unit having a plurality of signal members selectively positionable vertically on said carrier unit,
    and a mechanism for resetting the signal members positioned along said track comprising
    a plurality of sector shaped cam members,
    means for pivoting each said cam member about a substantially horizontal axis transverse to the track for movement downwardly and forwardly into the path of the signal members on the carrier unit,
    each said cam member having an arcuate surface for engaging the signal members,
    individual electromagnets for said cam members for holding said cam members upwardly and rearwardly out of the path of said signal members,
    and means operable by the movement of the carrier unit along said track for returning said cam members into the position upwardly and rearwardly out of the path of said signal members after they have been released by said electromagnets.

4. The combination set forth in claim 3 wherein said means for returning said cam members comprises
    an actuator arm positioned in the path of said carrier unit,
    an actuator on said carrier unit adapted to engage said actuator arm,
    and means interconnecting said actuator arm and said cam members for returning said cam members to their position upwardly and rearwardly out of the path of said signal members.

5. The combination set forth in claim 3 wherein said means for returning said cam members comprises
    an actuator arm pivoted about an axis transverse to the track and having its lower end positioned in the path of said carrier unit,
    an actuator on said carrier unit adapted to engage the lower end of said actuator arm,
    and means interconnecting said actuator arm and said cam members for returning said cam members to their positions upwardly out of the path of said signal members.

6. The combination set forth in claim 5 wherein said last-mentioned means includes
    a lever arm adapted to be moved by said actuator arm,
    a projection on each said cam member adapted to be engaged by said lever arm for returning said cam member to its position out of the way of said signal members.

7. The combination set forth in claim 6 including
    a transverse roller on said lever arm,
    said roller adapted to engage said projections on said cam members for returning said cam members to their initial positions.

8. In an overhead conveyor system comprising a track, a carrier unit having a plurality of signal members selectively positionable vertically on said carrier unit, the improvement comprising
    a mechanism for resetting the signal members adapted to be positioned along said track,
    said resetting mechanism comprising a plurality of cam members,
    means for mounting each said cam member for movement downwardly and upwardly,
    said cam members when in downward position being adapted to engage said signal members,
    individual electromagnets for holding said cam members upwardly,
    means for deenergizing each said electromagnet to permit its respective cam member to move downwardly into the path of said signal members,
    and means for returning said cam members into upward position after they have been released by said electromagnets.

9. In an overhead conveyor system comprising a track, a carrier unit having a plurality of signal members selectively positionable vertically on said carrier unit, the improvement comprising
    a mechanism for resetting the signal members adapted to be positioned along said track,
    said resetting mechanism comprising a plurality of sector shaped cam members,
    means for pivoting each said cam member about a transverse horizontal axis for movement downwardly and forwardly,
    said cam members when in downward position being adapted to engage said signal members,
    each said cam member having an arcuate surface for engaging the signal members,
    individual electromagnets for said cam members tending to hold said cam members upwardly,
    and means for returning said cam members into the upward position after they have been released by said electromagnets.

10. The combination set forth in claim 9 wherein said means for returning said cam members comprises
an actuator arm adapted to be positioned in the path of said carrier unit for engagement by an actuator on said carrier unit,
and means interconnecting said actuator arm and said cam members for returning said cam members to their upward position.

11. The combination set forth in claim 9 wherein said means for returning said cam members comprises
an actuator arm pivoted adjacent the path of said carrier unit and swung in the path of said carrier unit for engagement by an actuator on said carrier unit,
and means interconnecting said actuator arm and said cam members for returning said cam members to their upward position.

12. The combination set forth in claim 11 wherein said last-mentioned means includes
a lever arm adapted to be moved by said actuator arm,
a projection on each said cam member adapted to be engaged by said lever arm for returning said cam member to its position out of the way of said signal members.

13. The combination set forth in claim 12 including
a transverse roller on said lever arm,
said roller adapted to engage said projections on said cam members for returning said cam members to their initial positions.

14. In an overhead conveyor system, the combination comprising
a carrier unit movable along a path,
said carrier unit having a plurality of signal members selectively positionable vertically on said carrier unit,
and a mechanism for resetting the signal members positioned along said path comprising
a plurality of cam members,
means for mounting each said cam member for movement into and out of the path of the signal members on the carrier unit,
individual electromagnets for said cam members for holding said cam members out of the path of said signal members,
and means operable by the movement of said carrier unit along said path for returning said cam members into the position out of the path of said signal members after they have been released by deenergizing said electromagnets.

References Cited in the file of this patent
UNITED STATES PATENTS

| | | |
|---|---|---|
| 2,979,183 | Capanna | Apr. 11, 1961 |
| 3,070,213 | Rabinow | Dec. 25, 1962 |
| 3,091,324 | Brown et al. | May 28, 1963 |

FOREIGN PATENTS

| | | |
|---|---|---|
| 584,274 | Great Britain | Jan. 10, 1947 |

UNITED STATES PATENT OFFICE
CERTIFICATE OF CORRECTION

Patent No. 3,177,814                 April 13, 1965

Leonard J. Bishop

It is hereby certified that error appears in the above numbered patent requiring correction and that the said Letters Patent should read as corrected below.

Column 5, line 12, after "and" insert -- adapted to be --.

Signed and sealed this 5th day of October 1965.

(SEAL)
Attest:

ERNEST W. SWIDER
Attesting Officer

EDWARD J. BRENNER
Commissioner of Patents